Jan. 14, 1958     M. KOULIKOVITCH     2,819,645
APPARATUS FOR DETERMINING THE DISTANCE OF A MOBILE
OBJECT FROM A REFERENCE STRAIGHT LINE
Filed May 7, 1954
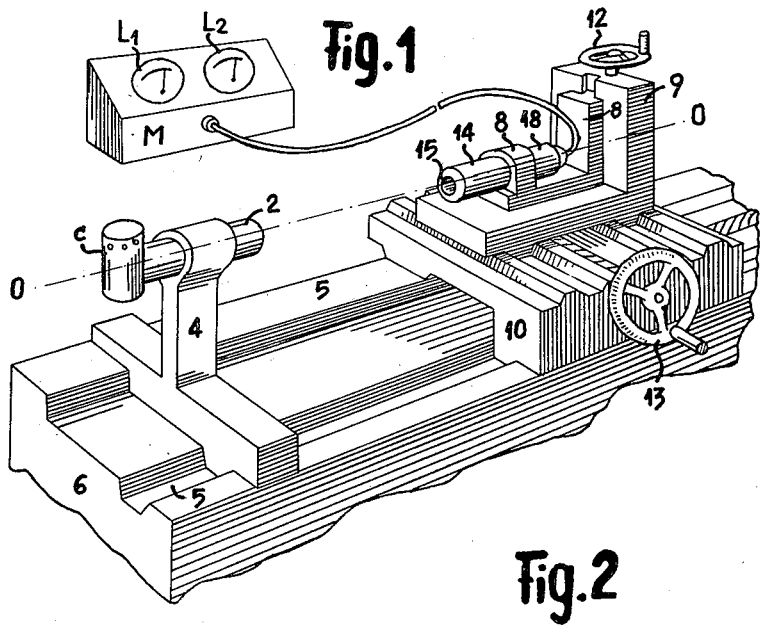
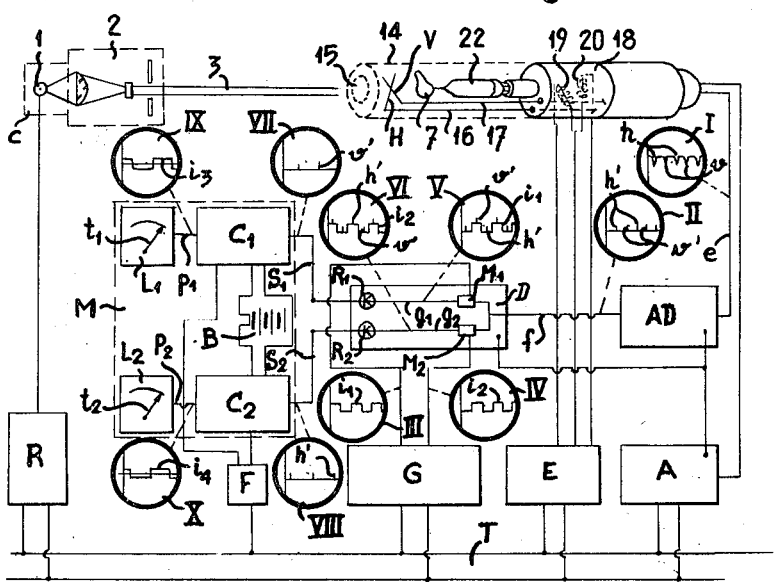
INVENTOR
MIRON KOULIKOVITCH
By Young, Emery & Thompson
Att'ys.

United States Patent Office 2,819,645
Patented Jan. 14, 1958

2,819,645

APPARATUS FOR DETERMINING THE DISTANCE OF A MOBILE OBJECT FROM A REFERENCE STRAIGHT LINE

Miron Koulikovitch, Geneva, Switzerland, assignor to Societe Genevoise d'Instruments de Physique, Geneva, Switzerland, a corporation of Switzerland Application May 7, 1954, Serial No. 428,283

Claims priority, application Switzerland May 23, 1953

6 Claims. (Cl. 88—14)

In order to check up the distance between a mobile object and a reference straight line which may also displace itself in the space, the simplest process is to measure the distance which separates the mobile (at each point of its trajectory) from two non-parallel planes, materialized by rulers machined with the highest possible accuracy.

The two rulers are simultaneously or succesively so adjusted as to be almost parallel to the trajectory of the mobile, which, in practice, is often regarded as being approximately straight.

The distance is measured by means of comparators or micro-indicators fixed onto the the mobile and which move with it, while the "feelers" of these apparatuses rest on the rulers.

This process assumes that the rulers are perfectly plane, which is never the case.

On the other hand, the accuracy of the comparators and micro-indicators, sometimes insufficient, is further decreased when the feeler rubs along the reference surface.

In order to remedy these defects, one has sought solutions by optical way. The most current consists of using the self-collimation principle, with making use of a telescope and a mirror. In this case, one does not measure the distances between a theoretical straight line and the movements of a mobile, but the angular deviations. It is therefore necessary to make calculations in order to translate, in function of the distance, the angular deviations into length. On the other hand, the operator must displace, of known quantities, either the telescope or the mirror and successively perform measurements. It is not possible for him to follow in a continuous manner the deviations between a straight line and the movement of the organ which he displaces.

Another arrangement consists in fixing onto the mobile a lighted reference mark. By means of fixed optical devices, one forms the image of the mark in the vicinity of this reference mark itself and one aims both of them by means of the same microscope. The distance between the mark and its image varies in function of the position deviations of the stylus. The arrangement is such that the image performs a movement in a direction contrary to that of the mark. This method presents the drawback of not being capable of being utilized over a great length, and of not allowing a continuous measure, because the operator must look into the ocular of a microscope.

The present invention relates to a process for checking up the distance separating a mobile from a reference straight line, which aims at remedying the mentioned drawbacks by materializing said straight line by the axis of a beam of practically parallel rays, directing said beam on a target sensitive to the intensity of said beam, periodically intercepting said beam by means of at least one intercepting member to which one imposes a sustained oscillating movement and transforming the optical signals received by said target in electrical signals emitted at moments which are function of the ratio of the time intervals between the interruptions of said beam during a double oscillation of the intercepting member.

The invention also relates to an installation for carrying out the said process. This installation presents a source of rays associated with an optical device, forming a beam of practically parallel rays, directed onto a photo-electric cell, said source of rays and said cell being carried by the organs of which the relative positions must be checked up, at least one intercepting member performing a sustained oscillating movement and intercepting the said beam during each oscillation and an electronic apparatus controlled by the electric impulses emitted by said photo-electric cell, said apparatus transforming the said impulsions in instantaneous electric signals emitted at moments which are function of the ratio of the time intervals between the interceptions of said beam during a double oscillation of the intercepting member.

The attached drawing shows diagrammatically and by way of example, an embodiment of an installation for carrying out the process.

Fig. 1 is a diagrammatic perspective view of the installation.

Fig. 2 is a diagram of said installation.

The represented installation includes a source of rays 1 located in a casing c and associated with an optical device 2 forming a beam of rays 3 practically parallel. The source 1 and the optical device 2 are carried by a fixed support 4, the position of which, along guides 5 carried by a frame 6, may, however, be chosen and fixed.

The beam of rays 3 is directed along an optical axis O—O parallel to the guides 5 and hits a target 7 placed in an envelope 14 and carried by a vertically movable support 8. This support is carried by a slide 9, movable horizontally, at right angle with the guides 5. This slide 9 is carried, in its turn, by a carriage 10 which is movable along the guides 5.

The displacements of the support 8 are controlled by an operating organ 12, while the displacements of the slide are controlled by an operating organ 13. An operating organ (which is not represented) is provided for in order to move the carriage 10. The target 7, constituted by a photo-electric cell, is sensitive to the intensity of the rays which are hitting it. This photo-electirc cell is protected by a metal casing 14 provided with an opening 15 giving passage to the beam 3.

Within the photo-electric cell are disposed two intercepting members, V and H. Intercepting member H is carried at the end of an elastic blade 16, the other end of which is anchored in the socket 18, carried in support 8. Similarly, the intercepting member V is carried at the end of elastic blade 17, the other end of which is anchored in socket 18. The blade 16 passes intermediate its length near one pole of an electromagnet 19 which is horizontally disposed, and the blade 17 passes intermediate its length near one pole of vertically disposed electromagnet 20. The electro-magnets 19 and 20 are fed with alternating current from dephasing feeder block E.

The alternating current supplied to electro-magnet 19 imposes an oscillatory movement on elastic blade 16, and this causes intercepting element H to move horizontally substantially in a vertical plane, while the alternating current supplied to electro-magnet 20 imposes an oscillatory movement on elastic blade 17, causing intercepting element V to move vertically substantially in a vertical plane, the two planes being close to each other. The frequency of oscillation of each element V and H is regular, and, due to the action of dephasing feeder block E, the movement of these elements is dephased by some 90° with respect to each other.

The photo-electric cell 7 is connected to an amplifier electronic valve 22 fed by a feeding block A. This valve 22 is connected by a conductor e to a derivation amplifier AD fed by the block A and connected to a discriminator D. The latter receives current impulsions of rectangular shape emitted by a generaor G and which superimpose, in mixers $M_1$ and $M_2$, to the signals issuing from the derivation amplifier AD. This discriminator D further comprises two rectifiers $R_1$ and $R_2$ which direct the signals formed by the intercepting member V in a line $S_1$ and the signals formed by the intercepting member H in a line $S_2$.

The line $S_1$ is connected to an electronic switch $C_1$ of known type, fed, on the one hand, by a feeding block F and, on the other hand, by a battery B.

The line $S_2$ is connected to an electronic switch $C_2$, which is exactly similar to the switch $C_1$, and also fed by the feeding block F and the battery B.

Finally, each switch $C_1$ and $C_2$ feeds a reading device $L_1$, $L_2$, constituted by a direct current measuring instrument presenting a great mechanical or electrical inertia. These switches and these reading instruments constitute a measuring device M. The installation is fed by an alternating current distributing system T.

The operation of the described installation is the following:

When the source 1 of monochromatic luminous rays is fed by the rectifier R, the optical device 2 forms a beam 3 of practically parallel rays, directed parallelly to the guides 5. The intercepting members V and H, actuated by their electro-magnets 19 and 20, perform each a sustained oscillating movement. These two oscillating movements are of even frequency, but present between themselves a phase setting of about 90°. Thus, the beam of parallel rays 3 is alternatively intercepted by one and by the other of these two intercepting members. The result is that the luminous flow caught by the photoelectric cell 7 undergoes variations which constitute optical signals. Similarly, the electric current emitted by this cell presents variations caused by the said optical signals.

In the conductor $e$ connecting the electronic amplifier 22 to the derivation amplifier AD, runs a current presenting the shape shown on graph I. This current presents sudden intensity variations $v$ and $h$, created respectively by the intercepting members V and H.

The symmetry axes of the oscillating movements of these organs determine, by their crossing, the optical axis of the system, the target 7 having in itself no determined axis at all.

Thus, when the aggregate, intercepting members V and H and cell 7, is centered on the axis O—O, the ratio of the times elapsing between three successive passages of one or the other of these members V and H through the beam 3—passages which take place during a double oscillation of this member—is equal to one, these passages keep going on at regular time intervals.

In this case, the variations of the current $v$ keep going on at regular time intervals, as well as the variations of the current $h$.

On the contrary, a vertical displacement of the support 8 causes an asymmetry in the succession of the passages of the member V through the beam 3, and the ratio of the times elapsing between three successive passages of this member during a double oscillation is no longer equal to one, but larger or smaller than one, according to the displacement direction of the support 8. As a consequence, the ratio of the times elapsing between three successive variations of current $v$ will also be different from one.

A horizontal displacement of the slide 9 causes also an asymmetry in the succession of the passages of the member H through the beam 3 and, therefore, a modification of the ratio of the times elapsing between three successive variations of current $h$.

The ratio of the times elapsing between three successive variations of current $v$ being in proportion with the vertical displacement of the cell, constitutes, therefore, a measure of this displacement. Similarly, the ratio of the times elapsing between three successive variations of current $h$ constitutes a measure of the horizontal displacement of the cell 7.

The action may be visualized by imagining a vertical line on target 7, which is divided into three equal parts, the upper and lower extremities of the line coinciding with the limits of movement of intercepting member V. Assume that the beam of light 3 strikes this line a third of the way from its top, and assume that "reading" starts when member V is at the top, starting down, at a speed such that each half cycle consumes three units of time. Interception of the beam 3 will occur as follows: after one unit; after four units; after two units. Since the first measurement, one unit, doesn't enter, it will be seen that the ratio of the times elapsing between three successive interceptions, which cause current variations in the current $v$, is in this case 4:2 or 2:1. The fact that the ratio is not unity indicates that there is misalignment. Obviously, in the example given, if there is exact alignment, the ratio would be 1½:1½, or 1:1.

As shown on graph I of Fig. 2, the variations of current $v$ and $h$ have the shape of a rounded triangle or of a Gauss bell curve in extreme cases, so that their respective position is rather difficult to define. This is why one transforms these current variations $v$ and $h$ in instantaneous current impulses $v'$ and $h'$ (graph II) by means of a derivation amplifier AD of known type such as described, for instance, in the U. S. Patent No. 2,448,718. The current impulses $v'$ and $h'$ are always created at the same instant in relation to the passage of the organ V through the beam 3, respectively to the passage of the organ H through the beam 3.

The current impulses $v'$ enabling to measure the vertical displacements of the cell and the impulses $h'$ the measure of the horizontal displacements, it is necessary to separate one from the other these two sequences of instantaneous impulses.

For this purpose, the impulses $v'$ and $h'$ are directed by a conductor $f$ on two mixers $M_1$ and $M_2$, which are both fed by a current $i_1$, $i_2$ of rectangular shape (graphs III and IV). The amplitude of these rectangular currents is at least equal to the amplitude of the impulsions $v'$ and $h'$, the frequency of these currents is equal to twice the frequency of the oscillation movements of the members V and H and, finally, the current of rectangular shape brought into the mixer $M_1$ is dephased by 180° in relation to the current of rectangular shape feeding the mixer $M_2$.

At the exit from the mixers, one obtains in the conductors $g_1$ and $g_2$, connecting these mixers to their rectifier $R_1$ and $R_2$, rectangular currents $i_1$, $i_2$, with superimposed current impulses $v'$ and $h'$, as represented by graphs V and VI.

After rectification at the higher level of the rectangular currents, in order to completely eliminate these currents, one obtains in the conductor $S_1$, the impulsions $v'$, and in the conductor $S_2$ the impulsions $h'$ (graphs VII and VIII). The impulsions $v'$ control the switch $C_1$, while the impulsions $h'$ control the switch $C_2$.

These electronic switches are of known type and already described in Swiss Patent No. 280,542. Each impulse $v'$ or $h'$, causes the reversion of a direct current generated by the battery B and traversing the measuring instruments $L_1$ and $L_2$ connected to the switches by conductors $p_1$, $p_2$ (graphs IX and X).

Having regard to the great electrical or mechanical inertia of these instruments, their mobile parts $t_1$ and $t_2$ cannot follow the direction changes of the currents $i_3$, $i_4$ which traverse them. On the contrary, each of these mobile parts takes an equilibrium position which is a function of the ratio of the times of flowing of the current in one direction or in the other. Now, this time ratio being the same as that between the times elapsing between the successive current impulses $v'$ or $h'$, it is clear that, in fact, each measuring instrument translates the unevenness of the times elapsing between the successive passages of one or the other member V and H through the beam of parallel beam 3, this unevenness of the times being a measure of the displacements of the cell 7 along each of the rectangular coordinates in relation to the optical axis O—O.

The described installation thus enables to detect and measure in an accurate manner the displacements which a mobile may perform in relation to a straight line while this mobile displaces itself along said straight line. This new checking up process enables to perform quickly a quantity of checks which, until now, were long and difficult to perform.

It is obviously possible to replace the described measuring device M by any other known measuring device. Thus, for instance, the measuring device might include two luminous sources each fed by one of the impulsion sequences $v'$ and $h'$. These luminous sources emit flashes which light two stroboscopic devices making visible the differences of the times elasping between the successive flashes. Such a measuring device is described, for instance, in U. S. Patent No. 2,401,712.

The measuring device might also include two cathodic oscillographs fed by the instantaneous impulsions $v'$ and $h'$. Such an oscillograph is already described in Swiss Patent No. 281,171, for instance.

It is obvious that the installation might include only a single intercepting member, for instance the element V. In this case, the checking up installation could only detect the vertical deviations of the cell 7 in relation to the axis O—O.

In such an installation, the discriminator D could be suppressed and the instantaneous variations $v'$ emitted by the derivation amplifier AD directly control the measuring device, which, in this case, comprises but one reading device $L_1$.

Finally, the measuring device could comprise a device controlling motor actuating the support 8 and the slide 9 and tending to bring back the cell 7 in the optical axis as soon as the slightest deviation takes place. In this case, the described installation may be used on machines of which the organs must perform rectilinear movements.

The beam of rays 3 may present, in transversal cross-section any desired shape (circular, rectangular, in form of a cross, etc.) and adapted, in each case, to the imposed conditions.

The source of rays 1 with its associated optical device 2, on the one hand, and the photo-electric cell, on the other hand, constitute the two main parts of a photo-electric aiming device. Consequently the position of these two elements may be interverted, the photo-electric cell being fixed while the source of rays, together with its optical device, being carried by the mobile.

I claim:

1. Apparatus for determining the distance of a mobile object from a reference straight line comprising means to project a beam of parallel rays of light along said straight line, a photo-electric cell carried by said mobile object, said means adapted to project said beam onto said cell, two intercepting members adjacent the target of said cell, means to cause said members to oscillate across said target at a constant frequency and dephased relative to each other, each of said members oscillating substantially in a plane perpendicular to the beam and each of said members oscillating in mutually perpendicular directions, said cell receiving an optical signal upon each interception of said beam and generating a current variation at each said signal.

2. Apparatus according to claim 1, and electronic apparatus connected to receive the current variations of said cell, said electronic apparatus comprising a derivation amplifier to convert each of said current variations into an instantaneous electric impulse.

3. Apparatus according to claim 2, and a discriminator separating the signals resulting from one of said intercepting members from the other of said intercepting members.

4. Apparatus according to claim 2, and a measuring means to receive each of said separated signals, said measuring means translating the time ratio elapsing, for each intercepting member, between a first and succeeding interception, and the succeeding interception and the next succeeding interception.

5. The apparatus of claim 4, and motor means controlled by each of said measuring means, each said motor means moving said mobile object in a direction parallel to the direction of movement of one of said intercepting means, whereby to cause said cell to remain in the optical axis of said beam.

6. Apparatus for determining the distance of a mobile object from a reference straight line comprising means to project a beam of parallel rays of light along said straight line, a photo-electric cell carried by said mobile object, said means adapted to project said beam onto said cell, intercepting members near the target of said cell, means to cause said members to perform a regular periodic movement across said target at a constant frequency and dephased relative to each other, each of said members moving in a plane substantially perpendicular to said beam, said cell receiving an optical signal upon each interception of said beam and generating a current variation at each of said signals.

References Cited in the file of this patent

UNITED STATES PATENTS

| 2,065,421 | Bernarde | Dec. 22, 1936 |
| 2,567,005 | Bennes | Sept. 4, 1951 |
| 2,692,527 | Wetzel et al. | Oct. 26, 1954 |
| 2,694,804 | Wagner | Nov. 16, 1954 |